United States Patent [19]  [11] 4,082,022
Horn et al.  [45] Apr. 4, 1978

[54] TUBE CUTTING APPARATUS
[75] Inventors: Charles F. Horn; Arthur L. Lerch; Raymond J. Turckes, all of Dayton; Ronald P. Nagel, Waynesville, all of Ohio
[73] Assignee: The Vulcan Tool Company, Dayton, Ohio
[21] Appl. No.: 558,730
[22] Filed: Mar. 17, 1975
[51] Int. Cl.² .............................................. B26D 7/06
[52] U.S. Cl. ......................................... 83/82; 83/198; 83/278; 83/111; 83/181; 83/212; 83/222
[58] Field of Search ................... 83/82, 111, 181, 190, 83/198, 212, 222, 348, 278, 276, 777

[56] References Cited
U.S. PATENT DOCUMENTS
2,837,156 6/1958 Brehm ....................................... 83/82
3,513,741 5/1970 Shallenberg ........................... 83/278
3,738,504 6/1973 Vail et al. ................................ 83/278

*Primary Examiner*—Donald R. Schran
*Attorney, Agent, or Firm*—Jerome P. Bloom

[57] ABSTRACT

A preferred embodiment of the invention provides tube cutting apparatus including, a head structure mounting cutter means defining a cutting station for a length of tubular material, an elongate rod-like structure for mounting the tubular material, tube engaging means for advancement of said tubular material along said rod-like structure to said cutting station, support means for said rod-like structure including a portion of table-like form, means for an initially free pivotal connection of said table-like support portion to said head structure and a pedestal type support for the opposite end of said table-like support portion including means for a lateral adjustment thereof about said pivot means to effect a precise alignment of said rod-like structure with said cutting station.

The embodiment has means defining a loading station for placement of said tubular material in connection with said tube engaging means, means for driving said engaging means along said rod-like structure, and means for energizing said driving means to produce an automatic placement of said tube engaging means at said loading station. The driving means has, in operative connection therewith, means to then effect a retraction of said tube engaging means from said loading station to a position defining a starting station. Means are provided to energize said driving means to move said tube engaging means and the tubular material engaged thereby in the direction of said cutting station an exact amount of travel in accordance with the segment to be cut from said tubular material and there are further means to sense an energized condition of said driving means and to prevent the operation of said cutting means until said driving means is fully deenergized.

23 Claims, 13 Drawing Figures

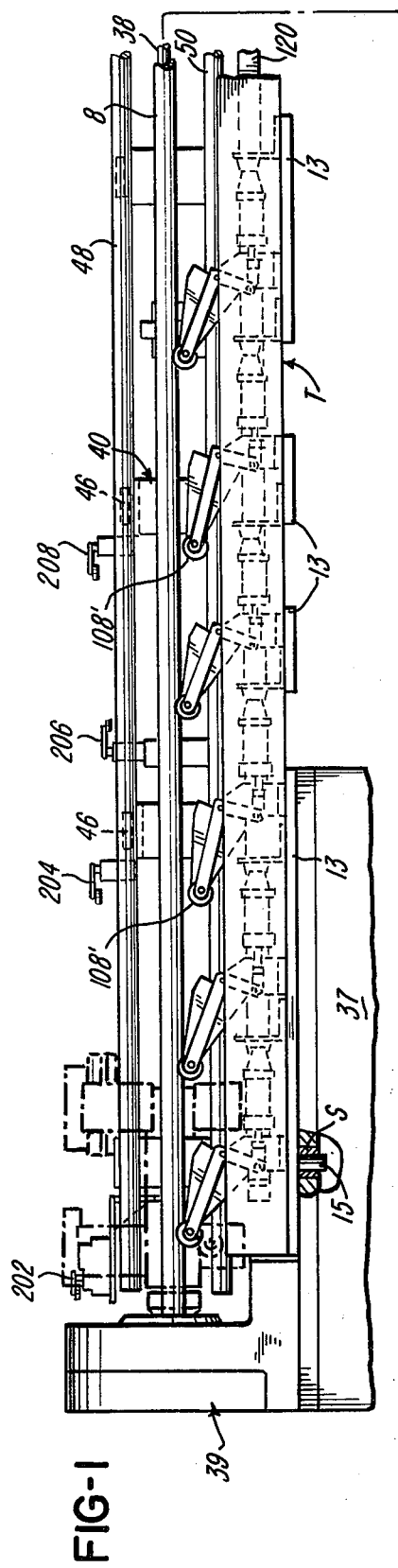
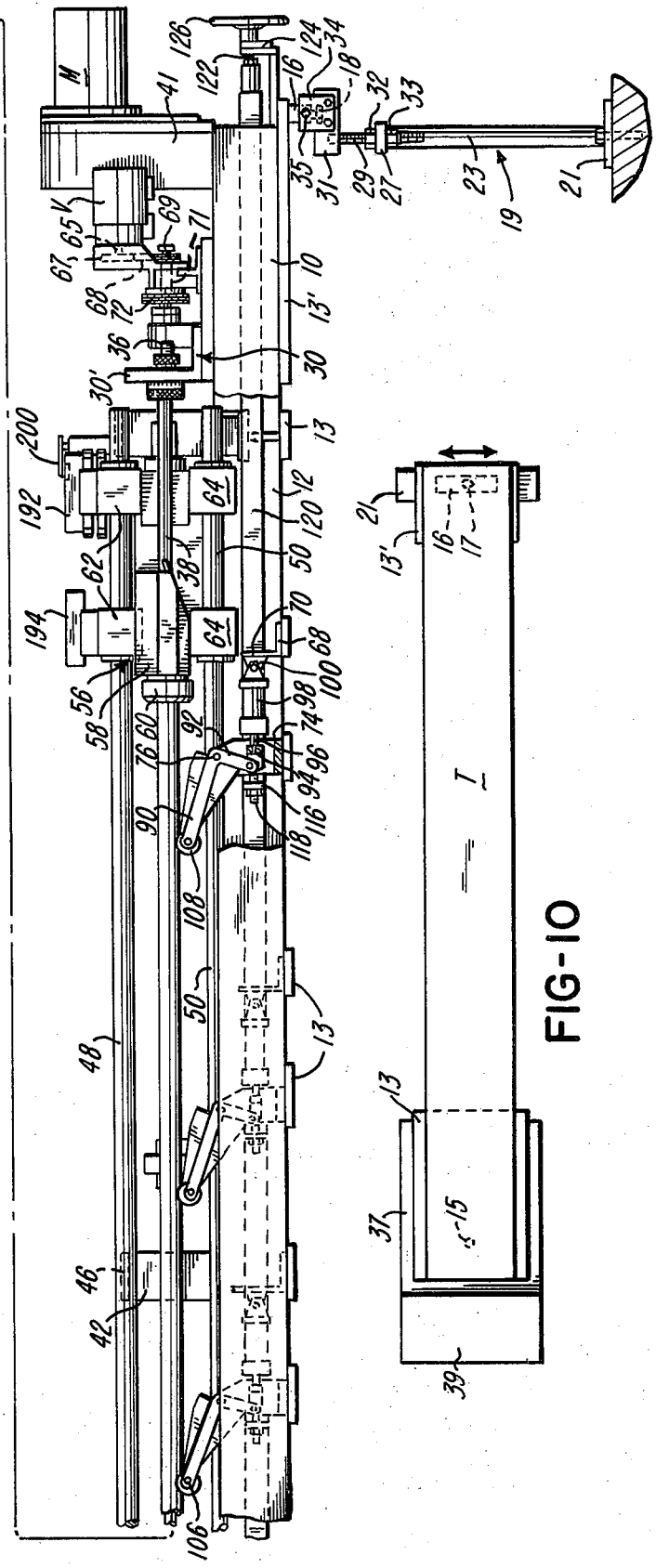
FIG-1
FIG-10

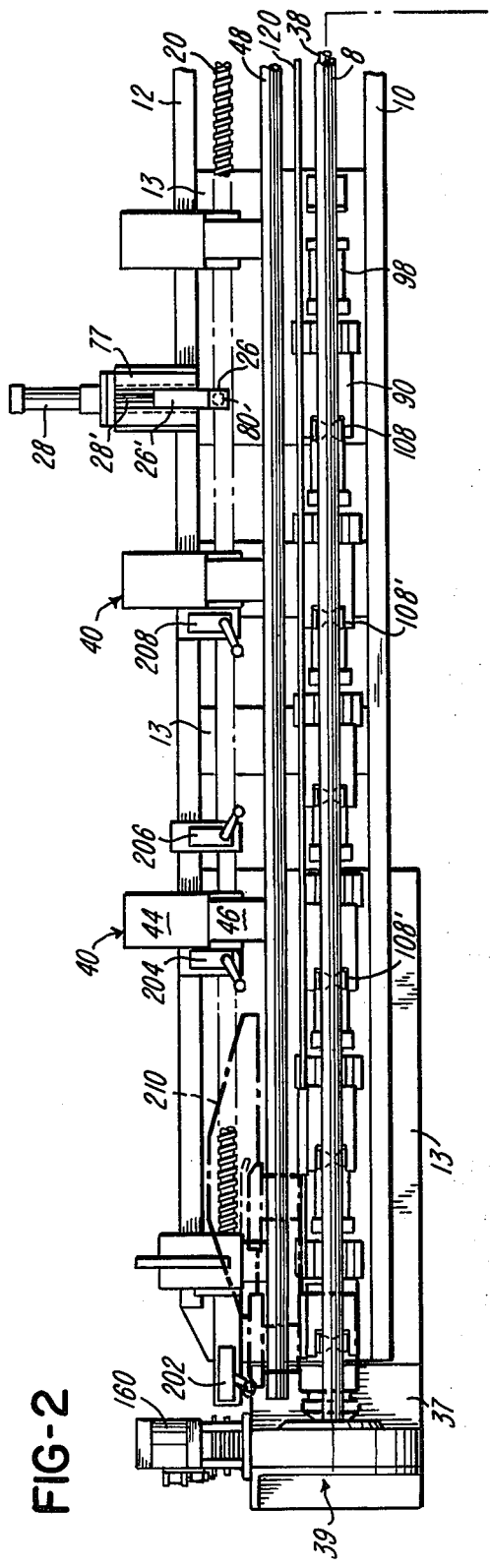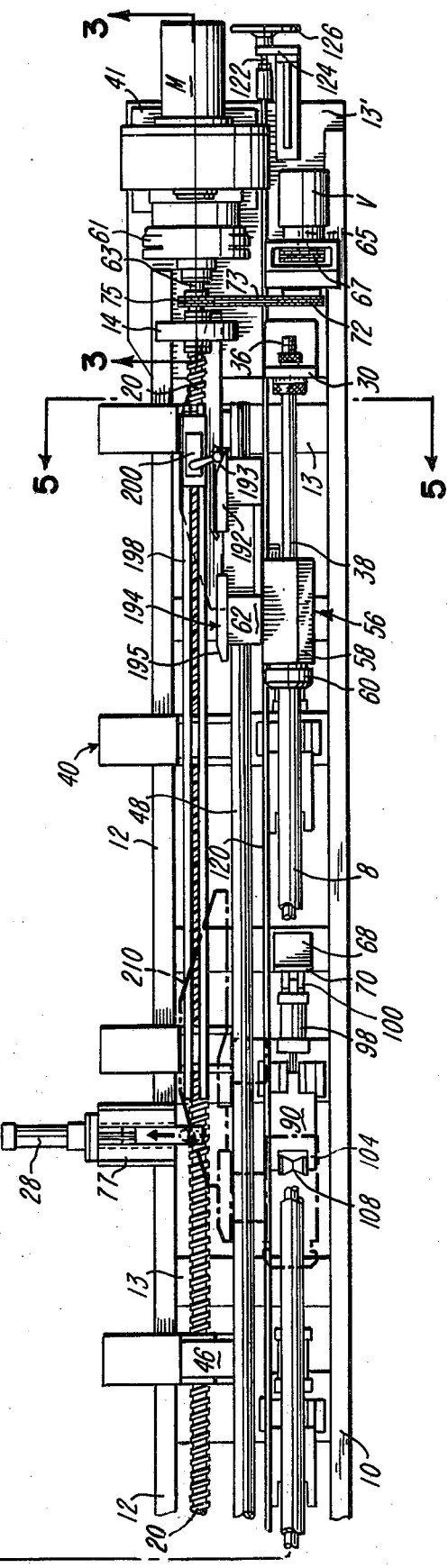
FIG-2

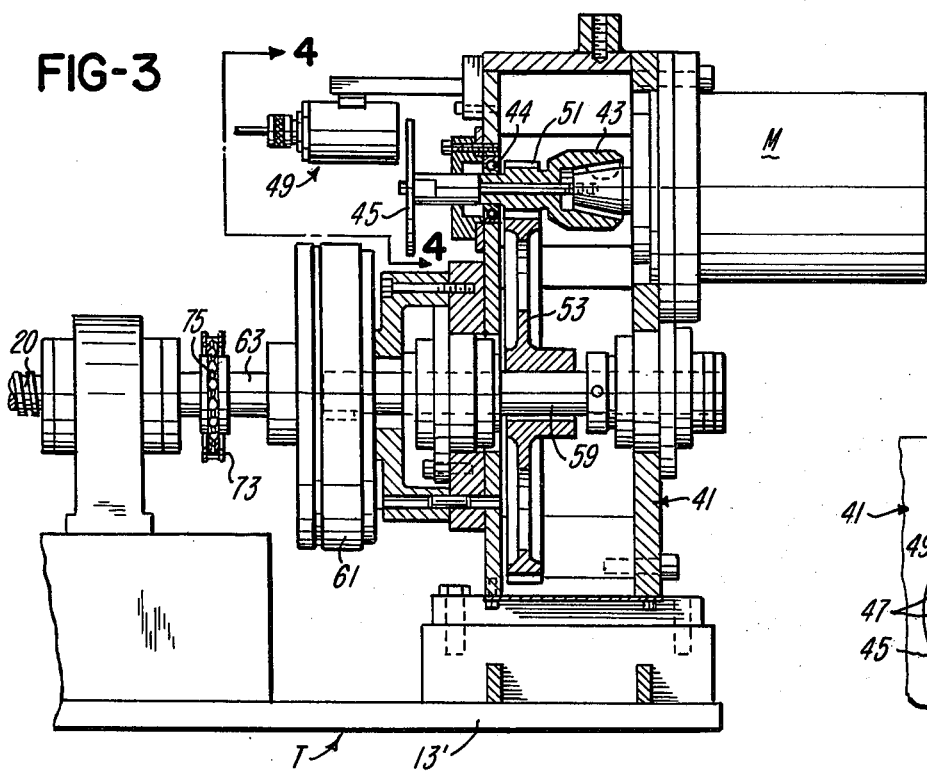
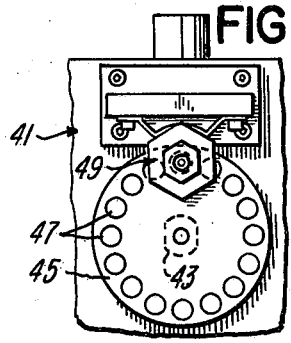
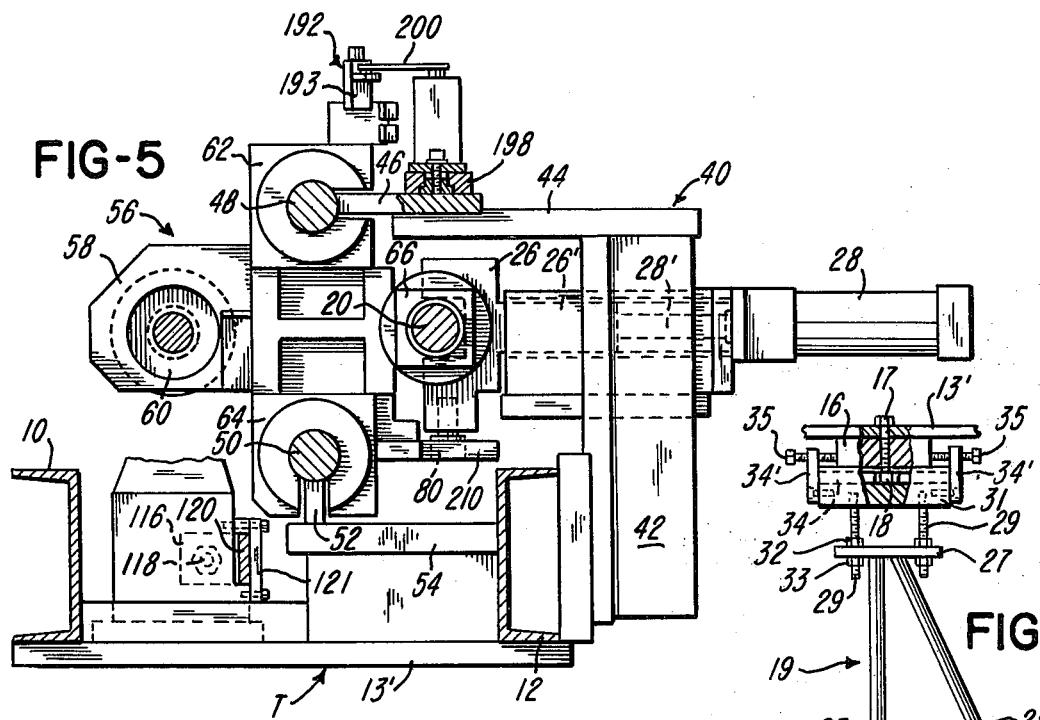
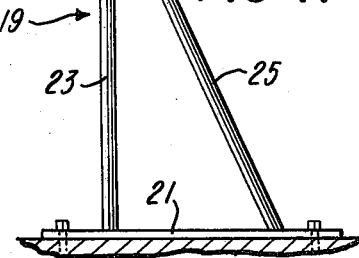

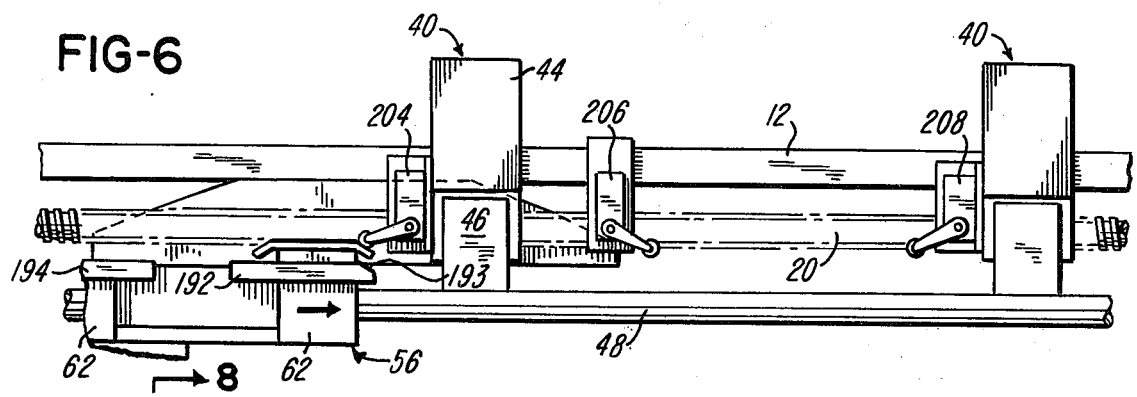
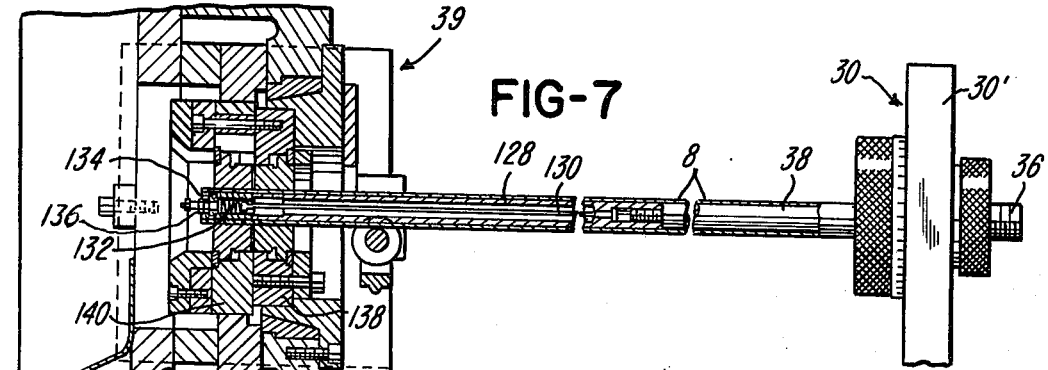
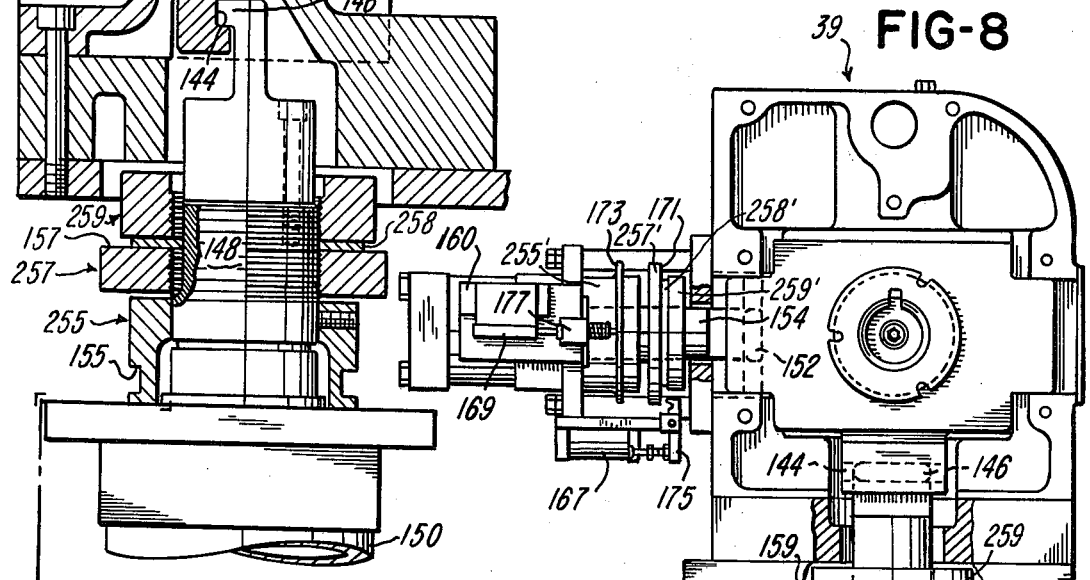
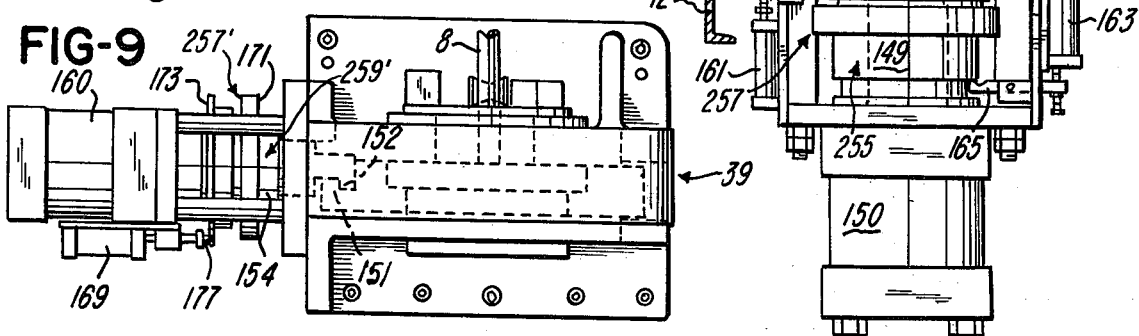

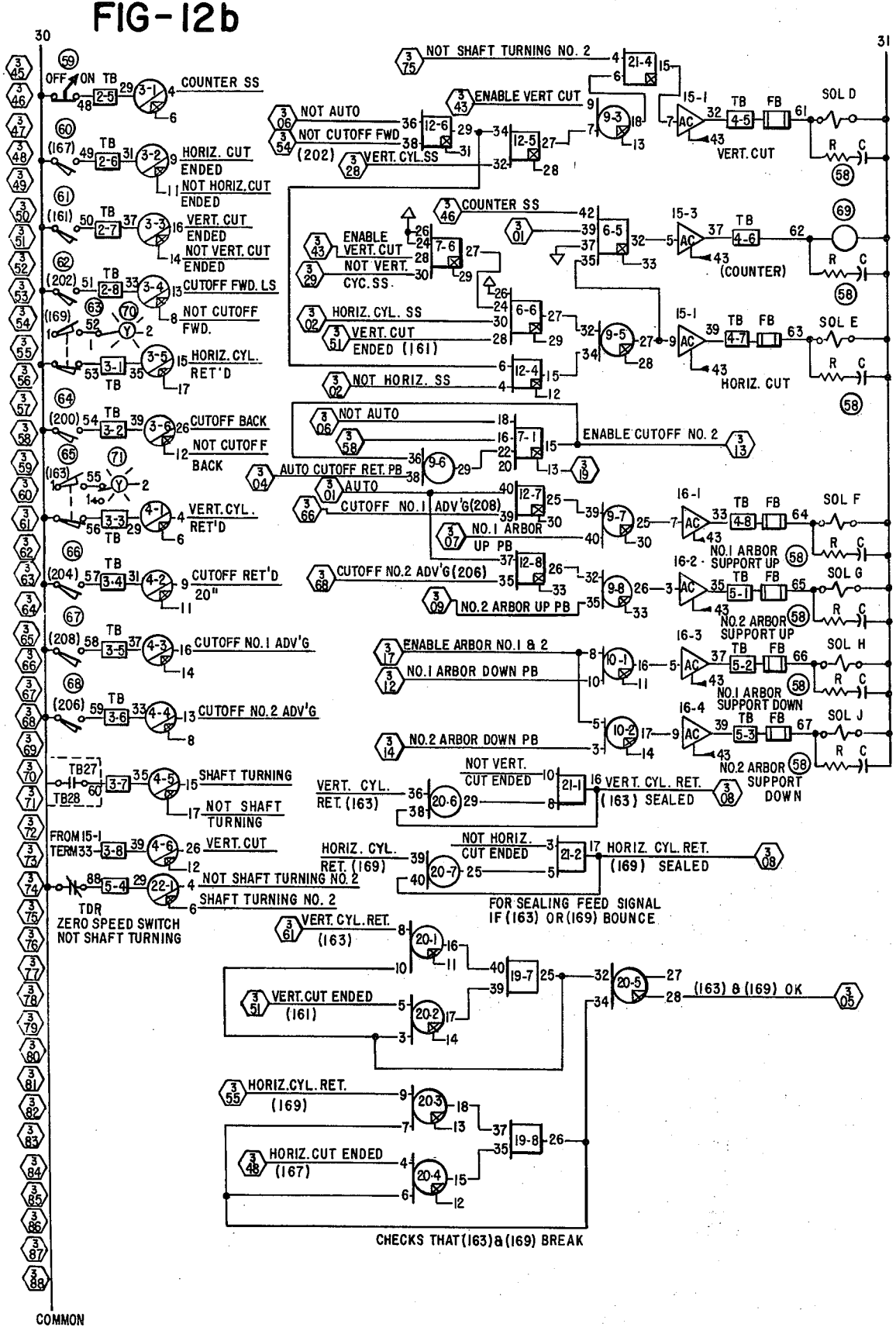

TUBE CUTTING APPARATUS

BACKGROUND OF THE INVENTION

This invention relates to improvements in tube cutting apparatus which renders such apparatus simple and economical to fabricate, more efficient and satisfactory in use, adaptable to a wider variety of applications and unlikely to malfunction. The improvements provided facilitate the application of work material of substantial length. Once the tubing is set, the invention provides for an extremely fast, accurate and automatic shearing thereof into segments of pre-set length. It enables a variety of products ranging from bands of ring-like form as narrow as 0.050 inch and sleeves to conventional short lengths of tubing.

The prior art is best represented by U.S. Pat. No. 2,837,156. While such apparatus remains suitable for many tube cutting applications, the construction thereof and the controls as there incorporated lack the efficiency, the flexibility and range of use now desired for many applications. The prior art apparatus is particularly lacking in respect to its ability to shear extremely short lengths of tubing or to handle, with any great degree of efficiency, work material of substantial length. In such applications, the nature of the work supports embodied therein as well as its feeding and limit controls have evidenced characteristics resulting in a lack of precision in their function and timing. This can lead to waste and high cost of production in a number of high speed shearing operaions. One particularly objectionable feature of the prior art apparatus has been the nature and character of its means for locating work material in the position required for cutting. The same has not only been costly to fabricate but space consuming and a contributing factor to malfunction and requirements for maintenance.

SUMMARY OF THE INVENTION

The present invention eliminates the above mentioned problems as well as lending speed, efficiency and reduction of cost, as well as flexibility, in tube cutting operations.

A preferred embodiment of the invention herein illustrated includes tube mounting and feeding means based on a table-like structure adjustably coupled at one end to a shearing head and releasably and adjustably mounted at its other end to a pedestal in a manner to facilitate a precisely required relation of its respective parts. In accordance with the invention the tubing forming the work material is slipped over an elongate arbor and fixedly coupled, in the process, to a feeder carriage which is mounted on and for movement longitudinally of the arbor. In the course of its mounting the work material is positioned so as to be supported by a series of longitudinally spaced devices including V-shaped rollers under the influence of air cylinders which precisely bias them to a required work supporting position, determined by the wall thickness of the stock. For movement thereof the feed carriage is coupled to a lead screw uniquely supported, intermediate its ends, to maintain a parallel relation to the arbor. The nature of the support structure and the arrangement provided is one to preclude whipping, stress and strain on the elongate lead screw and the arbor as well as the system components which bear thereon. The feeder carriage is under the control of the lead screw which is driven in turn by a stepping motor to advance the work material with reference to cutter elements in the shearing head. The degree of advancement of the work material is predetermined and precisely controlled. Movements of the lead screw reflecting an operating condition of the stepping motor are used to preclude operation of the cutter elements until the motor is fully stopped. Improvements are also incorporated in the shearing head to positively determine that the stepping motor and lead screw which constitute the feed indexing mechanism will not function until all the cutter elements are returned to a normal inactive position following a shearing or cutting operation.

It is noted that the arrangement provided for connection of the table structure with the shearing head and its remote end support contributes to ease of shipment as well as installation and adjustment of the tube cutting apparatus of the invention.

These and other features of the invention will become more evident from the following description of the preferred embodiment.

It is thus a primary object of the invention to provide tube cutting apparatus which is not only improved as to its construction but capable of being economically fabricated and installed and unlikely to malfunction.

An additional object of the invention is to provide tube cutting apparatus enabling and facilitating a high speed shearing of long lengths of tubing into extremely short segments approaching a ring-like configuration.

A further object of the invention is to provide an improved control system for tube cutting apparatus which eliminates objectionable prior art features and reduces the controls to their simplest most positively acting form.

An additional object of the invention is to provide tube cutting apparatus and elements thereof possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation is hereinafter described or illustrated in the accompanying drawings, or their equivalents.

Referring to the drawings wherein one but not necessarily the only form of embodiment of the invention is illustrated, FIG. 1 is a side elevation view of apparatus in accordance with the invention, certain details being omitted for clarity of disclosure;

FIG. 2 is a top plan view of the apparatus of FIG. 1, with certain details omitted to preserve a clarity of the invention disclosure;

FIG. 3 is a view taken on line 3—3 of FIG. 2;

FIG. 4 is a view taken on line 4—4 of FIG. 3;

FIG. 5 is a view taken on line 5—5 of FIG. 2;

FIG. 6 is a fragmentary view constituting an enlargement of a portion of the detail exhibited in FIG. 2;

FIG. 7 is a side elevation view of the shearing head shown partly in section to illustrate details of included cutter elements and their controls;

FIG. 8 is a further elevation view of the shear head taken on line 8—8 which diagrammatically illustrates the controls for the included cutter elements;

FIG. 9 is a top view of the shearing head;

FIG. 10 is a generally schematic showing of the nature and ease of the mount of the table structure of the FIG. 11 is an elevation view of the pedestal supporting the tail end of the table structure shown in FIG. 1.

Like parts are indicated by similar characters of reference throughout the several views.

Figure 12A:
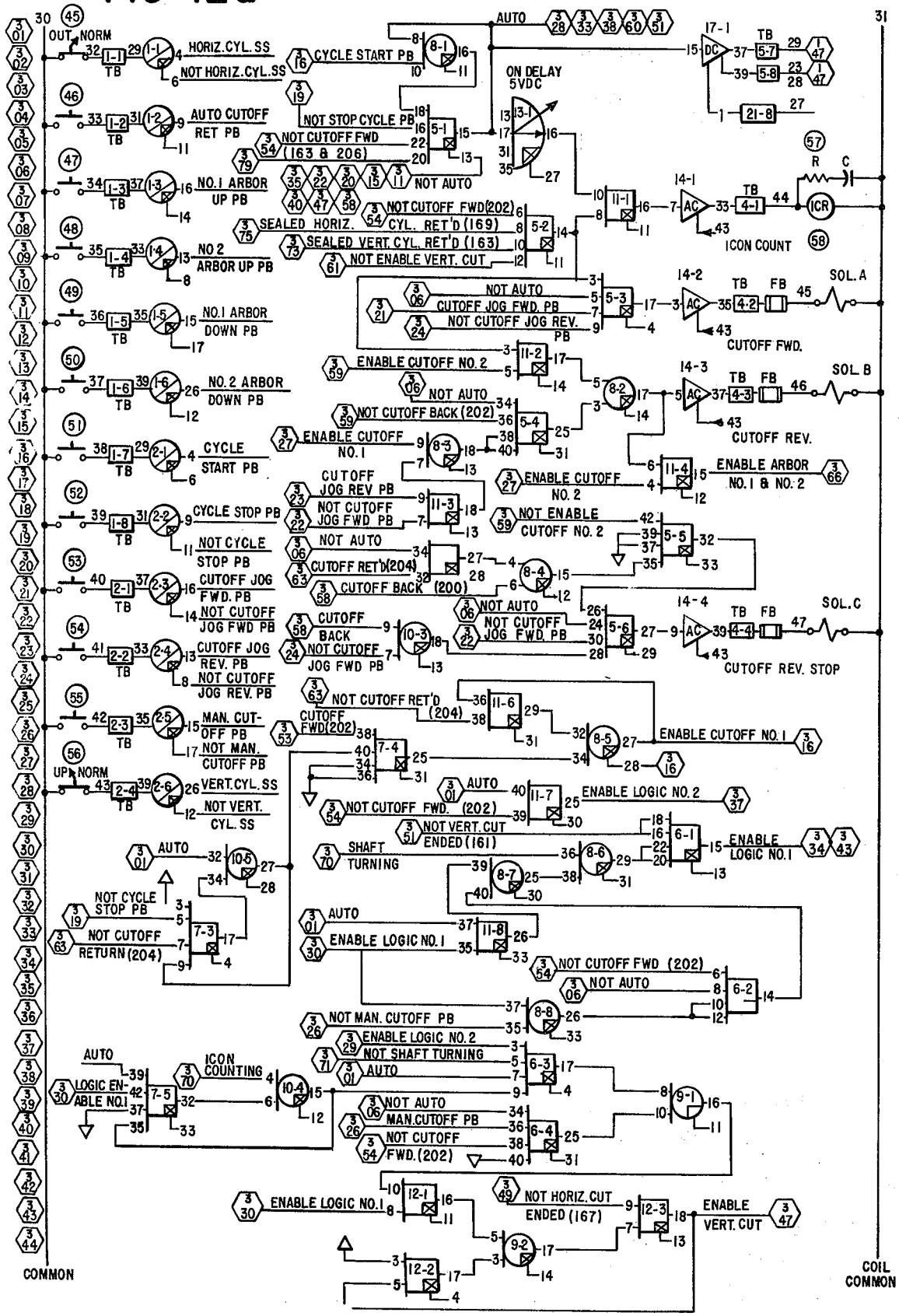
FIG. 12 is a numa-logic showing of the control circuits provided for the illustrated structure.

DESCRIPTION OF A PREFERRED EMBODIMENT:

In the preferred embodiment illustrated, the tube cutting apparatus of the invention includes a longitudinally extending Table T comprised of a pair of longitudinally extendinb beams 10 and 12 maintained in a spaced parallel relation by rigidly interconnected transversely disposed plates 13. The plates 13 are fixed to the bottom portions of the beams and longitudinally spaced. To what may be considered the head end of this beam assembly the plate 13 is enlarged, projects outwardly thereof at its lateral extremities, and embodies an interconnected dependent dowel member 15. The plate 13 at what may be considered the tail end of this assembly is also enlarged and for purpose of ready identification distinguished by the numeral 13'. A block 16 centered on and welded to depend from the underside of the plate 13' disposes in a sense transversely of the beams 10 and 12. At a central portion thereof the plate 13' and block 16 have aligned apertures which accommodate the body of a bolt 17 the head of which abuts the upper surface of plate 13' and the threaded dependent end of which projects below the block and mounts a nut 18.

The tail end of the beam assembly forming the table T mounts on a pedestal type structure 19. The lower portion of the pedestal 19 has the configuration of a right triangle which is truncated at its apex. It is comprised of a base plate 21 which may be anchored to a floor surface, a first rod-like member 23 welded to project perpendicular to the base plate 21, and a second rod-like member 25 which is anchored at one end to the plate 21 and projects upwardly therefrom in the manner of the hypotenuse of a right triangle. The upper ends of rod members 23 and 25 are spaced and bridged by a horizontally disposed block member 27. The latter is fixed in a parallel relation to the base plate 21. Projected through and vertically from the block 27 adjacent each of its respective ends, is a bolt-like member 29. The upper ends of the members 29 engage in the bottom of a bridging block shaped member 31 while their lower ends are threadedly engaged by vertically spaced nuts 32 and 33 which, when suitably adjusted to position the members 29, are respectively locked in abutment with the upper and lower surfaces of the block 27. As will be obvious, the nuts 32 and 33 enable the vertical adjustment of the members 29 to establish a desired level of the block 31. A keyway 34 formed in the upper surface of the block 31 extends from one end to the other, in a line parallel to and offset to one side of the plane defined by the members 29 and the pedestal structure therebelow of which they form a part.

The tail end of the beam assembly may be applied to the pedestal, thus provided, by a slip fit of that portion of the bolt 17 which mounts the nut 18 in the keyway 34. When this occurs, plates 34' may be bolted to cap the respective ends of the keyway to thereby effect a containment of the nut 18. The plates 34' are arranged to project upwardly of the respective ends of the block 31 where they are provided with axially aligned threaded apertures, each of which has threadedly engaged therein and projected therethrough an adjusting screw 35. The adjacent ends of the adjusting screws 35 are arranged to project into an abutted engagement with the respective ends of the intermediately positioned block 16. As so provided the screws 35 may be used for a micrometer type lateral adjustment of the beam assembly with reference to the underlying pedestal structure 19.

The head end of the assembly embodying the beams 10 and 12 is adapted to be connected to the base 37 of a shearing head unit 39, through the medium of the dowel member 15. In the embodiment here contemplated the base 37 is a frame-like rectangular structure including means, in a rear uppermost surface portion thereof, which defines a sleeve S providing a bearing which nests and accommodates the pivotal mount therein of the dowel 15.

Thus, to mount the table T one need only first drop the dowel member 15 into the sleeve S and immediately thereafter position the pedestal structure 19 under its tail end. The latter may be easily adjusted as previously described to position the Table T and any structure which mounts thereon in a precisely desired relation to the shearing head 39. Once this installation is complete, the base plate 21 may be releasably fixed to an underlying floor surface and bolts releasably applied to fix the head end plate 31 to the frame 37.

Mounted on and in connection with an integrated frame structure 41 projected upwardly from the plate 13', at the tail end of the table T, intermediate the beams 10 and 12, is an electro-hydraulic stepping motor M. The drive shaft of the motor M is positioned substantially above and in spaced parallel relation to the plane defined by the upper surfaces of the beams. Keyed to form an axial extension of the motor drive shaft is a short shaft segment 43. The latter projects through a bearing 44 in a plate forming part of the frame structure 41. Fixed to the projected extremity of the shaft 43 is a disc 45 embodying a series of circularly spaced magnets 47. The magnets 47 are so positioned that on drive of the motor M they are induced to move in a circular path so as to successively pass a sensor device 49. As long as the motor M is energized the moving magnets will transmit a signal thereof through the sensor device 49.

A small diameter gear 51 is integrally connected with the shaft 43 to mesh in driving engagement with a large gear 53 fixed to a shaft 59 below and in vertical alignment with the shaft 43. The shaft 59 also projects through and mounts for rotation in a bearing forming part of the support structure 41. Coupled to the forwardly projected extremity of the shaft 59 is the input portion of a clutch 61. Coupled to the output portion of the clutch 61 is a shaft segment 63 connected with and forming the tail end of a lead screw 20.

Mounted on and in connection with the plate 13' and the beam 10, to one side of the motor M, is a vane type hydraulic motor V. The forwardly projected end of the drive shaft 65 of the motor V mounts a sprocket 67 drivingly related by a chain 68 to a sprocket 69 fixed to a stub shaft 71 rotatably mounted in a bearing provided in the support structure 41, in a line spaced below and parallel to the drive shaft 65. A further sprocket 72 fixed to the shaft 71 is drivingly related by a chain 73 to a co-planar sprocket 75 fixed in a connected driving relation to the shaft segment 63 at the tail end of the lead screw 20.

As will be described, the clutch 61, when engaged serves as a medium for coupling the motor M to drive the lead screw 20 in one direction of rotation. When disengaged, the clutch 61 will uncouple the motor M to permit the motor V to be energized to drive the lead screw 20 in an opposite direction of rotation. Since the clutch 61 may be of a conventional nature well known to those versed in the clutch art, the details thereof are not here described or illustrated, particularly since in and of themselves they form no part of the present invention.

Lead screw 20 is positioned in a vertical plane commonly occupied by the drive shaft of the motor M, in a position adjacent to and spaced inwardly of the innermost side of the beam 12. Screw 20 is of considerable length in that it extends from adjacent the tail end to a point adjacent and spaced from the head end of the beam 12. Moreover, it is located in a horizontal plane which is immediately above and in spaced elevated relation to the plane defined by the upper surfaces of the beams 10 and 12. Each of the respective ends of the lead screw 20 bear in and project through a suitably configured bearing block 14 which enables its relative rotation. The screw 20 is further supported, at two locations spaced intermediate its ends, by retractable U-shaped saddle members 26.

Each saddle 26 is turned on its side to have the legs of the "U" vertically spaced and the base thereof outermost with reference to the adjacent beam 12. As seen in the drawings, the base of the U includes a central horizontally disposed cylindrical projection 26' connected to and in axial alignment with a piston rod 28' the head of which nests and bears in the housing of an air cylinder 28. The latter is mounted on a bracket 77 fixed in connection with a plate 13 to the outer side of the beam 12. The bracket 77 includes means providing a bearing for the projection 26' which maintains the required orientation of the saddle 26 during a reciprocating movement thereof. Such reciprocating movement is effected by means of a moving body, to be further described, as a portion thereof comes into contact with a disc shaped cam element 80 in connection with and forming the lower end of a vertically dependent projection on the lowermost leg of the U-shaped saddle 26. It is to be noted that a suitable source of air under pressure will be coupled to the respective cylinders 28 to apply air to the pistons therein under a pressure sufficient to normally maintain the saddles 26 in a position to nest in the open thereof, support and provide for the bearing rotation therein of the lead screw 20.

Secured immediately forward of the motor V, on a plate structure based in part on the upper surface of the beam 10 and structure in connection with the underlying plate 13', is a bracket 30. The bracket 30 includes plate portion 30' which projects in a sense upwardly from and perpendicular to the horizontal plane defined by the uppermost surfaces of the beams 10 and 12. The plate 30' has an aperture to receive and provide for the projection therethrough and the rotation therein of a screw 36 having in connection therewith a micrometer type adjusting means. Telescopically mounted on and in threaded engagement with the forwardly projected end of the screw 36 is the innermost end of an elongate shaft-like element constituting an arbor 38. The arbor 38 is arranged to extend in a line adjacent but spaced inwardly from the beam 10 and parallel to the lead screw 20, with which it occupies a common horizontal plane.

Fixed in connection with each of a plurality of the plates 13, on the outermost side of the beam 12, is a bracket 40. Each bracket 40 includes an arm portion 42 which projects upwardly of and perpendicular to the uppermost surface of the beam 12. Integrally connected with the vertically projected extremity of the arm 42 is a right angled arm portion 44. The latter projects in a sense inwardly of and parallel to the uppermost surface of the beam 12 and has a bar-like extension 46 which projects through a slot in a shaft-like member 48. The brackets 40 thereby serve to support the member 48 in a position intermediately of and in a spaced elevated relation to the lead screw 20 and the arbor 38.

A further shaft-like member 50 is positioned below, in vertical alignment with and in spaced relation to the member 48. The shaft 50 is fixed, in turn, on a plurality of vertically projected, bar-shaped elements 52. The latter mount perpendicular to and spaced longitudinally of a horizontal base plate 54 welded in connection with and extended laterally from the inner side of the beam 12. The connection between the elements 52 and the member 50 may be effected by providing slots or recesses in the underside of the shaft-like member 50 to receive and nest the vertically projected extremities of the bar elements 52. The connection between these elements may be effected in a suitable manner.

The members 48 and 50 serve to mount feeder device 56. The device 56 forms a carriage and includes a body portion 58 having a central longitudinally extending passage accommodating the insertion therethrough of the arbor 38. At its end remote from the micrometer screw 36, the body portion 58 mounts a collet 60 which rims one end of its central passage. As the material to be worked, in the form of a tube 8, is slipped on to the arbor from its head end, the inner end of the tube 8 will be engaged in and locked to the collet 60, whereupon it will be fixed for movement with and by the feeder device 56 as it is caused to move in a sense longitudinally of the arbor 38.

Fixed to the side of the body portion 58 most adjacent the beam 12, and integrally connected therewith, are pairs of longitudinally spaced collar-like projections 62 and 64. The collars 62 and 64 are vertically spaced and respectively receive therethrough and bear for movement on the shaft members 48 and 50. Connected to be integral with and in bridging relation to the collars 62 and 64 are means mounting a lateral projection in the form of a block-like collar 66 which surrounds a portion of the lead screw 20.

Fixed within the collar 66 is an internally threaded nut-like device (not shown) having a threaded engagement with the lead screw. By reason of this connection, a turning of the lead screw 20, in one direction or another, will produce a resultant movement of the collar 66 and of its integrally connected collar structure as well as the body portion 58 of the feeder device 56.

Each of a plurality of L-shaped brackets 68 mounted on and spaced longitudinally of the upper surface of the beam 10 includes a vertically projected plate portion 70. Further mounted on the beam 10 are a plurality of U-shaped brackets 74 the closed portions of which seat to the beam 10 and the leg portions of which project upwardly therefrom in a transversely spaced parallel relation to have their uppermost extremities bridged by a pivot pin 76. With reference to the drawings, it will be noted that the brackets 68 and 74 are paired, one of the brackets 74 being spaced immediately forward of and in line with each bracket 68.

Considering now the function of each pair of brackets 68 and 74, the pivot pin 76 on the bracket 74 extends through bearing means provided at the rear lower end of a plate 90 which is positioned to incline upwardly and forwardly therefrom. This positioning of the plate 90 is effected through the medium of a right angled interconnected arm 92 at its rearmost end which depends to pivotally connect to an adapter 94 on the projected end of a piston rod 96. The rod 96 is connected with a piston head housed in an air cylinder 98, the housing of which is anchored at its rearmost extremity in pivotal connection with a bracket 100 fixed to the plate portion 70 of the associated bracket 68. The forwardmost upwardly projected portion of the plate 90 is bifurcated to form transversely spaced fingers 104 bridged by a pivot pin 106 rotatably mounting a roller 108. The latter has the configuration of an hourglass, laid on its side, providing it with a generally V-shaped bearing surface.

As thus positioned, the rollers 108, which are spaced longitudinally of the beam 10 and in elevated relation thereto, provide V-shaped saddles which position directly under and in vertical alignment with the arbor 38.

It will be noted that two of the V-shaped rollers, which are identified by the numerals 108', are originally set by an appropriate application of air under pressure in their associated cylinders 98 to position at a level to engage and offer a direct support for the arbor 38. The others of the rollers identified by the numerals 108 are positioned to normally dispose at a level at which they will provide a direct and firm support for tubular work material. The setting of the rollers 108 will be determined by the outside diameter of the material to be worked. As will be further described, the rollers 108' and their linked air cylinders will be incorporated in a control circuit enabling them to automatically move to and from a supporting relation to the arbor 38, as needs require.

Spaced immediately forward of and parallel to an abutment surface formed on the lower end of each crank arm 92 is a plate member 116. The plates 116 are commonly fixed to and projected laterally from an elongate bar element 120 supported in bearings 121 spaced longitudinally of the inner side of the beam 10. Projected through and threadedly engaged in each plate 116 is a set screw 118, the projected extremity of which is engaged to and establishes a forward limit for the abutment surface of the adjacent crank arm 92. So mounted, the screws 118, which lie in a line parallel to the bar 120, determine the outermost projected positions of the piston rods 96 of the associated air cylinders 98. The control of the air cylinders 98 as thus provided determines the set position of the rollers 108 which support the tubular stock 8 slipped over the arbor 38. As will be obvious, the bar 120 may be longitudinally adjusted to simultaneously change the setting of all the air cylinders 98 to correspond with that required by the wall thickness of the stock 8 which one must work.

Any suitable means may be used for the longitudinal adjustment of the bar 120. For the purpose of this disclosure the tail end of the bar 120 is shown to be axially extended by an adapter embodying, in connection therewith and for rotation relative thereto, a threaded rod-like extension 122. The extension 122 passes through an aperture in a support plate 124 fixed in connection with and projected vertically from the tail end of the beam assembly. To the rear of the plate 124 and bearing thereon, in captive relation thereto, in a control wheel 126 connected in a driving relation to the extension 122. As will be readily seen, on a suitable rotation of the wheel 126 and a corresponding rotation of the extension 122, the bar 120 is longitudinally adjusted, in the direction and to the degree desired. This adjustment will produce a corresponding adjustment of all the plate members 116, the result of which is an adjustment of the position of the crank members 92 and the piston rods 96. In this manner provision is made for the simultaneous and precise adjustment of the level of the rollers 108.

As will be further described, suitable controls are provided to insure a retraction of the rollers 108' at any time that they will be prevented from serving their intended arbor support function by intervening stock.

The head end of arbor 38 is reduced and threadedly engaged by a tubular punch element 128 which forms an axial extension thereof. The punch 128 has a section of its interior wall surface formed to produce a restriction in the passage defined thereby. Through this restriction is passed the body of a flexible rod 130 the expanded head of which is caused to abut the face of such restriction which is closest to the arbor 38. The body of the rod 130 projects through the punch 128, a second tubular punch 132 and a washer-like element 134 to have its projected extremity engaged by a lock nut assembly 136. The latter is adjusted on the rod 130 to draw the washer element 134 into an abutted relation to the outer end of the punch 132 to establish it in a normal coaxial relation with the outer or cutting end of the punch 128. The inner and outer diameters of the punch elements are the same so that in the normal coaxial position described one will form a direct continuation of the other.

In its connected relation to the arbor 38 the described punch assembly will position in a horizontal through passage defined in the shearing head by assembled cutting dies 138 and 140. The die 138 is a fixed die and has a cutting face which will position coplanar with the projected end surface of the fixed punch 128. The die 140 is a movable die the cutting face of which bears on the cutting face of the fixed die 138 and is in coplanar relation with the cutting face of the punch 132 which bears on the cutting face defined by the projected extremity of the punch 128.

The movable die 140 is contained in a vertically reciprocable slide plate 142 the lower end of which has in one face thereof a groove 144. Slidably engaged in the groove 144 is a right angled tongue 146 projected laterally of an adapter connected to the upper end of a piston rod 148. The head of the piston rod 148 is reciprocably mounted in the housing of a hydraulic cylinder 150 mounted in a fixed relation to the framework of the base 37 of the shearing head 39. As will be further described, in a shearing operation the piston rod 148 is energized to move the die 140 in an upward sense, to displace therewith, in the process, the movable punch 132. The nature of the flexible rod 130 is such to accommodate this vertical movement of the punch 132. The consequence of this vertical movement is that the tubular work material on the arbor and its extension is sheared at its upper and lower limit by a relatively slight vertical movement of the movable punch and die elements relative to the fixed punch and die elements on which they bear.

The slide 142 is mounted for movement in a sense vertically of and laterally contained for sliding movement in a horizontal slide member 151. As may be seen from the drawings, the slide 151 also has a groove formed in one face thereof, adjacent and parallel to its left-hand edge. Engaged in slip fit relation to this groove is the right angled tongue element 152 on an adapter on the projected end of a piston rod 154. The head of the rod 154 is slidably contained in the housing of a hydraulic cylinder 160. The latter is fixed to one side of the shearing head 39 to establish its longitudinal axis in a horizontal position.

It should be noted that the tongue and groove slidable connection of the tongue 146 with the slide member 142 is such to accommodate, where required, a lateral adjustment of the vertical slide 142 in correspondence with the horizontal adjustment of the slide 151.

As may be clearly seen with reference to the drawings, the dies 138 and 140 as well as the slides 142 and 151 are suitably contained in the shearing head 39 so as to establish the dies 138 and 140 respectively concentric to the punch 128 and the punch 132, in which position they normally provide for a slip fit of the tubular work material 8 over the punch elements and on to the arbor 38. As will be obvious, the invention apparatus is provided with suitable means for adjusting the relative position of its parts so the tubular work material will then position in a proper centered relation with respect to the punches and dies, ready for shearing.

The elements which serve to contain the dies 138 and 140 as well as the slides 142 and 151 are not further described since in and of themselves they are not pertinent to an understanding of the present invention. Moreover, the punches and dies and their mounted relation as just described, with reference to each other and with reference to the slides 142 and 151, are not new. They are of the same general character and have the same general function as the comparable parts shown in the aforementioned U.S. Pat. No. 2,837,156. However, while the punches and dies of the nature here illustrated are not per se improved, the controls associated therewith are improved by reason of the present invention.

Fixed for adjustment on and in connection with the piston rod 148 is a collar assembly 149. The latter comprises a fixed collar 255 followed by a locking collar 257, a non-rotatable washer 258 and a stop collar 259. The locking collar and the stop collar are both threadedly engaged to the body of the piston rod 148 while the washer 258 is keyed to the rod so as to enable an axial adjustment thereof in correspondence with a rotative adjustment of the collars 257 and 259 as and when required. Thus, the assembly comprising the collar 257, the washer 258 and the collar 259 is axially adjustable.

The fixed collar 255 and the locking collar 257 respectively provide remote surface portions which define longitudinally spaced, radially oriented, shoulders 155 and 157. In the upward movement of the rod 148 to provide for a vertical shear of portions of the tubular work material 8, the upper shoulder 157 is arranged to hit one end of a lever 159, which is pivotally connected, intermediate its ends, to the framework housing the cylinder 150. The opposite end of the lever 159 is caused thereby to close a switch 161 which completes a control circuit the function of which is to energize the cylinder 160. In conjunction with the engagement and pivoting of the lever 159, the stop collar 259 abuts a stop provided on the housing of the shearing head 39. This determines the upward limit of travel of the piston rod 148 and defines a position thereof in which it is held under the influence of the pressure of the applied hydraulic fluid.

On retraction of the rod 148 to place the connected slide 142 in its normal centered position, the shoulder 155 hits one end of a lever 165 pivoted on the adjacent framework to cause the remote end of this lever to close a control switch 163, the consequence of which will be further described.

It is noted that the various switches herein described are embodied in an improved control system enabling the automatic operation of the invention apparatus which will soon become obvious. The circuitry involved is set in a numa-logic form in the accompanying sheets of drawings identified as FIG. 12. Attention is directed to the fact that the numerals utilized in the circuitry of FIG. 12 bear no relation to those used in FIGS. 1-11 except as specifically designated.

The framework housing the horizontal cylinder 160 also mounts a pair of switches 167 and 169. These switches are operable by a collar assembly on the piston rod 154 which is similar in character to the collar assembly 149, which collar assembly includes a fixed collar 255' and an axially shiftable assembly comprising a locking collar 257', a washer 258' and a stop collar 259'. In this case, remote surface portions of the fixed and locking collars respectively define shoulders 171 and 173. On projection of the rod 154 to move the associated slide 151, together with the nested slide 142 and the contained die 140, to shear, in a horizontal sense, the tubular work material 8 mounted on the punches 128 and 132, its limit of travel is determined by engagement of the stop collar 259' with a stop in connection with the shearing housing, in the process of which engagement the shoulder 171 engages one end of a lever 175. The latter is pivotally mounted, intermediate its ends, on the framework housing the cylinder 160. In the course of its pivoting movement the opposite end of the lever 175 closes a switch 167. The switch 167, together with the closed switch 161 complete a circuit which energizes the controls for the cylinders 150 and 160 to direct hydraulic fluid in a manner to retract the piston rods 148 and 154 and to return the slides 151 and 142 to their normal centered position in which advance of tubular material 8 into the cutting station of the shearing head is accommodated.

On retraction of the rod 154 the shoulder 173 engages the projected end of a lever 177 which is pivoted to the adjacent framework intermediate its ends. This causes the opposite end of the lever to close the switch 169 and to open a companion switch in tandem therewith, to deenergize thereby the hydraulic cylinder 160. The closing of the switch 169 not only signals a return of the slide 151 but completes a circuit including the switch 163, the function of which will be further described. It is noted that the switch 163 has a further switch in tandem therewith which is opened on the retraction of the piston rod 148 simultaneous with the closing of the switch 163 to open the circuit under the influence of which the vertical cylinder was energized.

A control structure mounted on the collar 62 most adjacent the tail end of the beam assembly is identified by the numeral 192 while an identical control structure on the head end collar 62 is identified by the numeral 194. The control structures 192 and 194 are thus axially spaced and provide camming surfaces at their sides most adjacent the beam 12, the adjacent ends of which cam surfaces are co-planar while their remote end portions 193 and 195 are bent to smoothly and uniformly diverge from the vertical plane defined by their coplanar surface portions.

The cam structures 192 and 194 are operatively related to a series of switches 200, 202, 204, 206 and 208 mounted over and spaced longitudinally of the beam 12. The switch 200 is releasably fixed in and may be adjusted in a sense longitudinally of a track 198 supported in bridging relation to three longitudinally spaced brackets 40 at the tail end of the beam 12. The track 198 is positioned thereby above and in a vertical plane which is commonly occupied by the lead screw 20. As will be described, on engagement thereof by the cam surface 193 of the control structure 192, the switch 200 determines a rearwardmost limit of the feeder device 56. It will be obvious, therefore, that the position of the switch 200 on the track 198 must be established in the first instance in accordance with the particular length of the tubular material to be worked by the invention apparatus.

The control switch 202 is mounted in a fixed elevated relation to the head end of the beam 12 to have an operating arm thereof project in the path of the leading end 195 of the control structure 194 as it moves with the feeder device 56 to its limit of travel in the shearing of a tubular workpiece 8 into the required segments. A switch 204 in connection with a bracket 40 spaced to the rear of the switch 202 determines a loading station for the feeder device 56, at which station it is ready to receive and have positively engaged therein a length of tubular material to be cut.

As will be described, the closing of the switch 202 is effected by the control structure 194 to complete a circuit energizing the motor V on completion of the last shearing operation in respect to a tubular workpiece. This produces an automatic movement of the feeder device to the loading station, in the process of which the cam device 192 engages the operating arm of the switch 204. This results in a closing of the switch 204 and a simultaneous energizing of a solenoid which functions to interrupt the circuit which has afforded the power necessary to drive the motor V.

Spaced towards the tail end of the beam 12, in successive following relation to the switch 204, are further switches 206 and 208 which control the position of the arbor supports, the bearing surfaces of which are provided by rollers 108'.

The switches 206 and 208 include operating elements in a position to be engaged by the cam structure 192 as the feeder device moves to the tail end of the beam assembly.

The feeder device 56 has in connection therewith a further cam device 210 which is operatively related to the cam elements 80 on the lowermost legs of the U-shaped saddles 26 which support the lead screw 20. The cam 210 is a horizontally oriented plate structure which projects from the outer side of the collars 64 in the direction of the beam 12, so that in the course of the movement of the feeder device 56 from one end to the other of the arbor 38 the cam elements 80 will lie in its path. The respective longitudinally displaced ends of the cam 210 are sloped so that they will function, in either direction of its movement, to smoothly and gently engage and apply pressure to displace, in succession, the cams 80, the result of which is to force the saddles 26 outwardly from their supporting relation to the lead screw 20. As should be apparent, this action is taken to enable the free passage of the collar 66 embodying the nut device by means of which the feeder device is connected to and driven in a sense longitudinally of the screw 20.

For an understanding of the circuitry and the improved controls enabling the efficiency and improved function of the apparatus of the invention, reference is made to the numa-logic showing in FIG. 12 of this drawing. When taken in conjunction with the structure illustrated in FIG. 1 through 11, the showing in FIG. 12 should enable anyone versed in the art to practice the present invention and achieve its benefits. For the purpose of the present disclosure it appears unnecessary to go through the circuitry and the control systems of the invention apparatus item by item, particularly in view of the general disclosure in FIG. 12. Therefore, the controls will be described only with reference to the pertinent structure the understanding of which is necessary to recognize that the invention has provided unique improvements in the art of cutting lengths of tubing into segments of very limited length, which segments may approach ring-like configurations.

As noted previously, the index references of FIG. 12 bear no relation to those numbers applied to the structural elements of the invention embodiment above described with the exception of the identification therein of the 100 and 200 series numbers. The latter identify those switches the operation of which in a particular sequence are pertinent to functional aspects of the invention.

In use of the apparatus above described, with reference to FIG. 12, upon application of power one may close the appropriate switch S1 or S2 (FIG. 12) to induce a responsive movement of the feeder device 56 so as to position its collet 60 at the loading station defined by the position of the switch 204. At this point in time, the table structure T will have been set to establish the arbor 38 in a position to locate its connected punch elements 128 and 132 in a concentric spaced relation to the fixed and movable dies 138 and 140. The preciseness of the position of the arbor is particularly enabled by utilizing the arbor supports the bearing elements of which are provided by the rollers 108'. The spacing between the dies and the punches and the passage formed thereby in the shearing head 39 is such to permit a length of tubular work material 8 to be slipped over the punches and arbor to place its inner end in the collet 60 to which it is locked.

A switch S3 may then be manually operated to place the motor V in driving relation to the lead screw 20, as a result of which there is a rapid return of the feeder device 56 to its start position at the tail end of the arbor 38. In the process of its rearward movement with the feeder device, the control 192 thereon will engage and successively close the switches 206 and 208. As these switches are closed, the air cylinders 98 which respectively provide the base supports for the related rollers 108' are energized to retract their piston rods and produce a counter-clockwise movement of the pivotally connected arms 92 and the plate members 90 which pivotally mount the rollers 108'. This way, as the feeder device goes back, the arbor support rollers 108' are displaced and held in displaced position to clear the work material 8 which is coupled to the feeder device. Further, in the course of this rearward movement of the feeder device, its laterally projected cam plate 210 successively engages the cam elements 80 to successively effect a retraction of saddle members 26 from their supporting relation to the lead screw 20. Since a constant air pressure is applied to the cylinders 28 to maintain a bias on the saddle members 26, as the cam 210 clears the respective cam devices 80, this air pressure causes the saddle members to return to their normal position in which they contain and provide a bearing type support for the lead screw 20.

Also, in the course of the rearward movement of the feeder device to the tail end of the beam assembly, a cam plate 220 which forms a part of its body 58 is positioned to successively engage and cam the plate members 90 from the path of the feeder device. Subsequent to the passage of the feeder device, each plate 90 is biased upwardly, under the influence of a constant air pressure which is maintained in the related cylinder 98. The rollers 108 are caused thereby to return to their preset level which is originally established in accordance with the wall thickness of the tubular material 8 to be applied to the arbor. Thus, as the feeder device moves to a start position at the tail end of the beam assembly, the rollers 108 will successively move to a position in which they support and maintain the tubular work material in a precisely centered relation with reference to the cutting station provided in the shearing head 39.

The limit of movement of the feeder device 56 to the tail end of the beam assembly is determined by the engagement of its control element 192 with the switch 200. This engagement produces a closing of the switch 200 and the resultant control of a solenoid which opens the circuit which has energized the motor V. Moreover, the closing of the switch 200 conditions a control circuit for the clutch 61 to enable its completion upon closing of a switch S4, the result of which is to cause the clutch 61 to move to a condition in which it couples the motor M directly to the lead screw 20.

Having returned the feeder device 56 to the tail end of the beam assembly and the work material 8 having been established by the rollers 108 in a precisely required position for its advancement to the cutting station in the shearing head, the switch S4 is now closed to initiate an automatic reduction of the tubular work material into segments of prescribed lengths.

In the example illustrated the motor M is an electro-hydraulic stepping motor arranged so that one pulse from the electronic controls produces a turning of the coupled lead screw 20 the correct amount to move the feeder device 0.001 inch along the arbor 38. By setting appropriate digit switches conventionally provided in the controls of the motor, a prescribed amount of pulses will be designated to actuate the motor for a precise interval in accordance with the indexing movement it is desired to apply to the lead screw, in accordance with the length of the segment to be cut. Thus, with the switch S4 closed, motor M will be caused to function to move the feeder device and the engaged work material 8 a prescribed distance with reference to the punches and dies defining the cutting station in the shearing head 39. An important feature of the invention is that in conjunction with the application of pulses to the motor M its drive shaft 43 will turn the disc 45 and the magnets 47 will move with reference to and in a position to be sensed by the sensor device 49. As long as the device 49 senses a movement of the magnets 47, it will function to prevent the completion of the circuit required to energize the cylinder 150. The invention thus provides that a cutting action cannot take place until it is insured that the movement of the lead screw 20 is fully stopped. This prevents a premature cutting action, destructive of tools and materials.

When the device 49 senses that the rotation of the disc 45 and the magnets 47 has fully stopped, it operates a relay the consequence of which is to complete the circuit required to energize cylinder 150 and initiate a vertical stroke of its piston 148. As the piston rod 148 moves up with the energizing of the cylinder 150, it carries therewith the slide 142, die 140 and the punch 132. The stroke is relatively short but sufficient to effect a shearing of the tubular material 8 at its vertical limits, in a plane defined by the facing surfaces of the punches and dies. The upward limit of movement of the rod 148 is determined by the engagement of the stop collar 259 with the appropriate stop provided in its path, in connection with the housing 39. Simultaneously, in the process of achieving the upward limit of its movement, the shoulder 157 engages and pivots the lever 159 to close the switch 161 and complete a circuit to energize the cylinder 160. The slide 142 remains in its projected position together with the piston rod 148 since hydraulic pressure is maintained in the cylinder 150 at this time.

The energization of the cylinder 160 causes the horizontal projection of the rod 154 which carries therewith the horizontal slide 151 and the nested slide 142 together with its contained die member 140. At the end of this stroke of the rod 154, which is of limited extent, the lateral force applied through the die member 140 to the tube segment in the cutting station produces a shearing of the tube at its lateral extremities, a consequence of the cutting movement of the die member 140 and the inner floating punch 132 relative the fixed die 138 and the fixed punch 128. The net result of this operation is the completion of a cutting cycle in which a segment of prescribed length is cleanly and quickly separated from the main body of the tubular material 8. The limit of projection of the rod 154 is defined by the engagement of the collar 259' with a stop fixed on the housing 39. In the course of the movement of the collar 259' to come into engagement with the stop, the shoulder 171 comes in engagement with and pivots the lever 175. As the lever 175 is pivoted, it closes the switch 167. As the switch 167 closes and since the switch 161, embodied in the same circuit, is closed, a circuit is completed to energize both the cylinder 160 and the cylinder 150 to effect a retraction of both the piston rod 154 and the piston rod 148. The result of this procedure is to bring the punches and dies back to a centered concentric spaced relation in which they afford passage for advancement of the tubular work material to the cutting station for the removal of a following segment.

The retraction of the piston rod 154 provides for the shoulder 173 to engage and pivot the lever 177, whereupon its opposite end functions to close the switch 169 and to open a companion switch in tandem therewith, the latter of which functions to open the circuit which has previously powered the hydraulic cylinder 160. Similarly, the retraction of the piston rod 148 causes the shoulder 155 to engage a lever closing the switch 163. The latter also has in tandem therewith a switch which is opened simultaneous with the closing of the switch 163 to open the circuit under the influence of which the vertical cylinder was previously energized. On the closing of both the switch 163 and the switch 169, then and only then is a circuit completed to power the motor M which is then operated and functions as previously described. It advances the feeder device 56 the required increment along the arbor 38 to position the head end of the tubular work material so that a successive cutting operation as described will produce the shearing of a segment of the tubular material and the separation thereof from the main body of the workpiece in the form as precisely required.

The cycle just described will be repeated in reference to each tube segment to be cut. Once the system has been energized for an automatic operation, the incremental advance of the tubular workpiece at required intervals as well as the cutting thereof as prescribed is fully automatic until the control 194 on the feeder device 56 engages the switch 202. This is in concert with the achievement of a final cut of the stock and a completion of the segmenting thereof into elements of required form and dimension.

Of course, as the feeder device 56 is indexed as it is moved from the tail to the head end of the arbor 38, as the segments are cut from the tubular workpiece, the cam plate 210 will serve its intended function of displacing the saddles 26 from the path of the collar 66, as and when required. Moreover, the control element 194 will in the course of advance of the feeder device towards the head end of the beam assembly function also to effect the successive engagement and closing of the switches 208 and 206 to provide that as the feeder device passes each roller 108' that the related air cylinder 98 will be energized to lift the roller. Thus, when the arbor 38 is exposed once more, the rollers 108' will be brought up to assume a supporting relation thereto and maintain the position thereof precisely as required.

Simultaneous with the engagement of the switch 202 by the control element 194, a circuit is completed to effect an automatic movement of the feeder device to the loading station represented by the switch 204, the engagement of which by the control element 192 automatically opens the circuitry involved to terminate the automatic movements of the parts of the invention apparatus.

At this point the feeder device is in a position that one may clear any tube segment which might remain in connection therewith and slip a new length of tubular work material over the arbor and establish the same in a fixed relation to the collet 60. The sequence of events necessary to effect an automatic cutting of the tubing into desired segments will be as previously described.

It should be obvious that certain aspects of the operating sequence preliminary to the automatic cycling of the work material for complete reduction thereof may be somewhat varied without departing from the concepts of the present invention.

In summary, it will be seen that the invention embodies a number of new and important features. A prime feature is the utilization of the zero speed switch as represented by the interrelation of the magnets 47 and the sensor device 49. As noted previously, it is extremely important that there be no movement of work material or associated parts at the time that a cutting action is attempted. The arrangement as provided by the invention precludes such happening and avoids considerable damage and loss in tools and material which might otherwise occur.

A further highly important and beneficial feature of the invention is the arrangement for the unique supports and the control of the supports provided for both the lead screw 20 and the arbor 38, as well as the work material. The concept of using the U-shaped saddles enables a condition where whipping and displacement of the lead screw during the turning thereof in the operation of the invention apparatus is inhibited. The support provided by the saddles 26 is optimal. By reason of their configuration, and the cooperative relation with the cam devices on the feeder device, the interval of time during which a saddle member is retracted is of extremely short duration.

Particular attention is directed to the fact that the invention makes important use of air cylinders, achieving spring-like mounts which are not subject to the disadvantages of springs, such as the lack of inherent stability in many cases. Note also the nature of the bearing supports provided for the arbor and the work material. Their configuration as well as the backing thereof by air cylinders lends important advantage and insures precision operation of the invention apparatus and the products achieved in the use thereof. The supports lend unusual stability to the arbor.

An additional feature is provided by the control means whereby the level of the rollers 108 which provide support for the work material may be simultaneously adjusted to complement the wall thickness of the work material applied to the arbor.

Over and above all the advantages here noted, is the improved utilization and interrelation of switch controls to achieve a sequence of operation fashioned in a manner to insure against malfunction. The interrelation of the controls are such that neither can feeding take place while cutting is any way still in process nor can cutting take place while there is any motion in the feed screw in the indexing operation. Insurance is provided by the arrangement whereby the horizontal and vertical cylinders are jointly retracted after the cutting action is completed and only upon the completion of the cutting action. This means that with their joint retraction and the necessity for the making of switches by both, no circuit can be completed to power the lead screw until the punches and dies return to their normal required position.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect and the invention is therefore claimed in any of its forms or modifications within the legitimate and valid scope of the appended claims.

The embodiments of the invention in which an exclusive property or privilege is claimed are defined as follows:

1. Tube cutting apparatus comprising a shearing head, a table-like structure mounting means for engaging, supporting and for moving a tube through a cutting station defined at said shearing head, said shearing head including means for guiding and for cutting said tube at said cutting station, said moving means including an energizable motor for advancing said engaging means with respect to said shearing head, means for energizing and deenergizing said motor to impart a pulsing operation thereto in which said engaging means is advanced in pulse-like increments of motion, a signal device operatively connected to the drive shaft of said motor to move therewith, and sensing means associated with said signal device and responding to motion thereof to preclude an operation of said cutting means while said signal device is in motion.

2. Tube cutting apparatus as in claim 1 characterized by said tube supporting means including a shaft-like element on which tubular material to be cut is slipped in loading thereof to have one end positioned for movement with the tube engaging means, said shaft-like element being oriented to extend in a sense longitudinally of said table-like structure and incorporating therewith means for supporting said tubular material in said cutting station, said shaft-like element having in underlying relation thereto a plurality of supports which are longitudinally spaced, said supports being retractable under the influence of and in an automatic response to movements of said tube engaging means.

3. Apparatus as in claim 2 characterized by said means for supporting said tubular material in said cutting station including a fixed punch and a floating punch normally mounted by flexible means in axial alignment with said fixed punch.

4. Apparatus as in claim 2 characterized by a portion of said supports being positioned to provide bearings for said shaft-like element, which shaft-like element has the form of an arbor, and other said supports being positioned to support tubular material to be cut which is mounted on said arbor and to establish the said material in an orientation for advancement along said arbor for successive and precise cut thereof by said cutting means.

5. Tube cutting apparatus as in claim 1 characterized in that said moving means includes a lead screw in operative connection with said tube engaging means, and there being provided means for normally supporting said lead screw including bearing means spaced longitudinally thereof and means in connection with said tube engaging means operative in the movement thereof to induce retraction of said bearing means in the path of its travel.

6. Apparatus as in claim 5 wherein said bearing means include U-shaped saddles which are positioned to normally nest and contain said lead screw and preclude whip-like movements thereof during its rotation.

7. Apparatus as in claim 1 wherein said tube engaging means is a body having a passage through which is passed a shaft-like element providing a tube supporting means extending substantially the length of said table-like structure, said shaft-like element being connected with means mounting the same in a required orientation with respect to said cutting station, and said body having in threaded engagement therewith and passing therethrough a screw means constituting a part of said moving means, which screw means extends substantially the length of said table-like structure in parallel relation to said shaft-like element.

8. Apparatus as set forth in claim 7 characterized by said screw means having in operative connection therewith, and for selective coupling thereto, a plurality of means for drive thereof in a selected direction of rotation.

9. Tube cutting apparatus as in claim 1 characterized by said table-like structure and said shearing head being separable elements having means for a slip fit pivotal connection of one to the other and the end portion of said table-like structure remote from said pivotal connection means having a pedestal type support means providing for a micrometer type lateral adjustment of said table-like structure about said pivotal connection.

10. Apparatus as in claim 9 characterized by said pedestal including a triangular frame forming its base the upper end of which mounts means for the vertical adjustment of said remote end portion of said table-like structure.

11. Tube cutting apparatus comprising a head structure mounting cutter means defining a cutting station for a length of tubular material, a movable feeder device for the tubular material, a lead screw rotatable in one direction to advance the feeder device toward the cutting station and rotatable in the opposite direction to return the feeder device toward a retracted starting position, first and second motors connected respectively to rotate said lead screw in said one direction and in said opposite direction, means for effecting a pulsing operation of said first motor whereby advance of said feeder device occurs in steps of predeterminable length, and means for effecting a continuous relatively rapid operation of said second motor whereby said feeder device is returned to a starting position in a continuing motion more rapidly than it is advanced.

12. Apparatus as in claim 11, characterized by longitudinally spaced saddles positioning to bearingly support said lead screw and inhibit whipping thereof, and means responsive to passage of said feeder device thereby for displacing said saddles from a support position.

13. Apparatus as in claim 12, characterized by means in operative connection with said saddles for application of air under pressure to produce a bias of said saddles to positions wherein they provide a bearing support for said lead screw.

14. Apparatus as in claim 11, characterized by an elongate rod-like structure for mounting the tubular material, and support means including in underlying relation to said rod-like structure a series of longitudinally spaced bearing members, a portion of which include means to establish bearing surface portions thereof at a level to precisely support tubular material mounted on said elongate rod-like structure in an orientation to maintain the proper reference thereof during its advancement to said cutting station and another portion of said bearing support means having in connection therewith means to establish a level thereof to position in direct underlying and supporting relation to said rod-like structure.

15. Apparatus as set forth in claim 14 characterized by said portion of said longitudinally spaced bearing members for supporting tubular material mounted on said elongate rod-like structure having, in connection therewith, means for a simultaneous adjustment of the level thereof in correspondence with the outer dimension of said tubular material.

16. Apparatus as set forth in claim 15 characterized by said bearing surface portions being defined by rotatably mounted roller elements providing a generally V-shaped bearing surface.

17. Tube cutting apparatus as set forth in claim 11 characterized by means defining a loading station for said tubular material, means defining a starting position for said feeder device for commencement of an automatic reduction of said tubular material into small segments and means defining an advanced position for said feeder device indicating completion of the reduction of a length of tubular material into small segments and said means defining the respective starting and advanced positions being operatively related to produce an automatic reduction of said tubular material by said cutter means upon energizing said first motor when said feeder device is positioned at said starting position and there being means to preclude operation of said cutting means at any time that said lead screw is rotating to any degree.

18. Tube cutting apparatus comprising a head structure mounting cutter means defining a cutting station for a length of tubular material, an elongate rod-like structure for mounting the tubular material, tube engaging means for advancement of said tubular material along said rod-like structure to said cutting station, support means for said rod-like structure including a portion of table-like form, means for an initially free pivotal connection of said table-like support portion to said head structure and a pedestal type support for the opposite end of said table-like support portion including means for a lateral adjustment thereof about said pivot means to effect a precise alignment of said rod-like structure with said cutting station.

19. Tube cutting apparatus as in claim 18 characterized by means defining a loading station for placement of said tubular material in connection with said tube engaging means, means for driving said engaging means along said rod-like structure, means for energizing said driving means to produce an automatic placement of said tube engaging means at said loading station, said driving means having in operative connection therewith means to then effect a retraction of said tube engaging means from said loading station to a position defining a starting station, means for energizing said driving means to move said tube engaging means and the tubular material engaged thereby in the direction of said cutting station an exact amount of travel in accordance with the segment to be cut from said tubular material and means to sense an energized condition of said driving means and to prevent the operation of said cutting means until said driving means is fully deenergized.

20. Apparatus as in claim 18 characterized by said elongate rod-like structure constituting an arbor having in underlying relation thereto a series of air biased bearing support members selectively positioned for providing longitudinally spaced bearing supports for the tubular material and said arbor.

21. Apparatus as in claim 20 characterized by said bearing supports including bearing elements providing V-shaped bearing surfaces for nesting the tubular material or said arbor in accordance with its application.

22. Tube cutting apparatus comprising a head structure mounting cutter means defining a cutting station for a length of tubular material, a movable feeder device for the tubular material, a lead screw rotatable to advance the feeder device and thereby to advance the tubular material to and through the cutting station, a motor connected to rotate said lead screw and having a pulsing operation whereby advance of said feeder device occurs in steps of predeterminable length, means for effecting an operation of said cutter means between steps of said feeder device, means for sensing motion as imparted by said motor, and means controlled by said sensing means for precluding an operation of said cutter means in the presence of sensed motion.

23. Tube cutting apparatus comprising a head structure mounting cutter means defining a cutting station for a length of tubular material, a movable feeder device for the tubular material, a lead screw rotatable to advance the feeder device and thereby to advance the tubular material to and through the cutting station, a motor connected to rotate said lead screw and having a pulsing operation whereby advance of said feeder device occurs in steps of predeterminable length, means for effecting an operation of said cutter means between steps of said feeder device, a disc embodying a series of circularly spaced magnets and driven by said motor to rotate and to stop rotating simultaneously with rotation of and interruptions in the rotation of said lead screw, a sensing device sensing rotary motion of said disc responsively to a sensed movement of said magnets and means controlled by said sensing device for precluding an operation of said cutter means in the presence of sensed motion.

* * * * *

UNITED STATES PATENT AND TRADEMARK OFFICE
CERTIFICATE OF CORRECTION

PATENT NO. : 4,082,022

DATED : April 4, 1978

INVENTOR(S) : Charles F. Horn; Arthur L. Lerch; Raymond J. Turckes; and Ronald P. Nagel It is certified that error appears in the above-identified patent and that said Letters Patent are hereby corrected as shown below:

Col. 1, line 31, "operaions" is corrected to read -- operations --.

Col. 2, line 43, "is" is corrected to read -- as --.

Col. 3, line 16, "extendinb" is corrected to read -- extending --.

Col. 4, line 29, "31" is corrected to read -- 13 --.

Col. 5, line 1, a comma is to be inserted following "engaged";

line 48, a comma is to be inserted following "nest";

line 49, -- end -- is inserted following "open";

line 54, -- a -- is to be inserted following "includes".

Col. 6, line 27, -- a -- is to be inserted following "mount".

Col. 7, line 68, "in" (second occurrence) is corrected to read -- is --.

Col. 10, line 9, -- an -- is substituted for "the" (first (occurrence).

Signed and Sealed this

Eighth Day of August 1978

[SEAL]

Attest:

RUTH C. MASON
Attesting Officer

DONALD W. BANNER
Commissioner of Patents and Trademarks